United States Patent
Alexiou et al.

(10) Patent No.: US 7,957,701 B2
(45) Date of Patent: Jun. 7, 2011

(54) CLOSED-LOOP MULTIPLE-INPUT-MULTIPLE-OUTPUT SCHEME FOR WIRELESS COMMUNICATION BASED ON HIERARCHICAL FEEDBACK

(75) Inventors: Angeliki Alexiou, Swindon (GB);
Federico Boccardi, Swindon (GB);
Howard C Huang, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 825 days.

(21) Appl. No.: 11/754,624

(22) Filed: May 29, 2007

(65) Prior Publication Data
US 2008/0299917 A1  Dec. 4, 2008

(51) Int. Cl.
*H04B 1/00* (2006.01)

(52) U.S. Cl. ......... 455/69; 455/63.4; 455/101; 455/415; 455/132; 370/328; 370/203; 370/380; 370/388; 370/335; 375/219; 375/240.14; 375/240.16; 375/240.22; 375/267; 375/299; 714/752

(58) Field of Classification Search .................... 455/69, 455/63.4, 101, 132, 415; 370/328, 203, 380, 370/388, 319, 335; 375/219, 240.14, 240.16, 375/240.22, 267, 299; 714/752
See application file for complete search history.

(56) References Cited

U.S. PATENT DOCUMENTS

| 5,194,950 | A  | * | 3/1993 | Murakami et al. | 375/240.16 |
|---|---|---|---|---|---|
| 5,592,227 | A  | * | 1/1997 | Feng | 375/240.14 |
| 5,892,549 | A  | * | 4/1999 | Feng | 375/240.22 |
| 6,567,949 | B2 | * | 5/2003 | Heinen et al. | 714/752 |
| 7,522,673 | B2 | * | 4/2009 | Giannakis et al. | 375/267 |
| 7,602,745 | B2 | * | 10/2009 | Lin et al. | 370/328 |
| 2002/0007473 | A1 | * | 1/2002 | Heinen et al. | 714/752 |
| 2007/0149180 | A1 | * | 6/2007 | Lin et al. | 455/415 |
| 2007/0149181 | A1 | * | 6/2007 | Lin et al. | 455/415 |
| 2008/0108310 | A1 | * | 5/2008 | Tong et al. | 455/69 |
| 2009/0141690 | A1 | * | 6/2009 | Fan et al. | 370/335 |
| 2009/0175320 | A1 | * | 7/2009 | Haustein et al. | 375/219 |

* cited by examiner

*Primary Examiner* — Lewis G West
*Assistant Examiner* — April G Gonzales
(74) *Attorney, Agent, or Firm* — Williams, Morgan & Amerson, PC

(57) ABSTRACT

The present invention provides methods implemented in a base station having a plurality of antennas and one or more user terminals. One embodiment of the method includes receiving feedback from at least one user in response to transmitting a first frame to said at least one user. The first frame is formed by pre-coding at least one symbol using at least one first code word selected from at least one first code book associated with the at least one user. The method also includes transmitting at least one second frame to the user(s). The second frame(s) are pre-coded using at least one second codeword selected from at least one second codebook. The second codebook(s) determined based on the feedback and the first codeword(s).

19 Claims, 5 Drawing Sheets

CLOSED-LOOP MULTIPLE-INPUT-MULTIPLE-OUTPUT SCHEME FOR WIRELESS COMMUNICATION BASED ON HIERARCHICAL FEEDBACK

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within the geographic area, or cell, associated with the base station. The wireless communication links between the base station and each of the users typically include one or more downlink (or forward) channels for transmitting information from the base station to the mobile unit and one or more uplink (or reverse) channels for transmitting information from the mobile unit to the base station. Multiple-input-multiple-output (MIMO) techniques may be employed when the base station and, optionally, the user terminals include multiple antennas. For example, a base station that includes multiple antennas can transmit multiple independent and distinct signals to multiple users concurrently and on the same frequency band. MIMO techniques are capable of increasing the spectral efficiency of the wireless communication system roughly in proportion to the number of antennas available at the base station. However, the base station also requires information about the state of the downlink channel(s) to each of the users to select users that have approximately orthogonal downlink channels for concurrent transmission. The channel feedback may be provided by the users on the reverse link, but this increases overhead associated with the MIMO transmissions, which reduces the spectral efficiency of the wireless communication system.

Random fluctuations in the channel states can create sets of downlink channels that are approximately orthogonal. Thus, if the number of users associated with a base station is large, these random fluctuations naturally tend to create groups of users that have approximately orthogonal downlink channels. Opportunistic MIMO schemes identify these groups of users so that the interference between the concurrent transmissions from the base station to the users in the selected group is within an acceptable tolerance level. For example, let $n_T$ denote the number of transmit antennas at the base station and let K indicate the number of users connected to the base station. Each user is equipped with $n_R$ receive antennas. The channel coefficients between each transmit antenna and each receive antenna at user k can be assembled into an $n_R \times n_T$ matrix $H_k$, k=1, . . . , K.

In a multi-user MIMO system that employs linear precoding matrices, the base station can transmit concurrently to as many as $n_T$ users, which can be chosen from the population of K users. The relationship between transmit and receive signals can be represented as:

$$y = HGd + n$$

where d is an $n_T$-dimensional vector containing the transmit symbols, y is the $n_R$-dimensional vector of received signals, n is an $n_R$-dimensional noise vector, and G is an $n_T \times n_T$ precoding matrix. Note that some of the entries of d may be zero if the base station chooses to transmit to less than $n_T$ users (this is sometimes termed "rank adaptation"). The mobile units and the base station also store copies of a codebook consisting of L quantization matrices, $C_i$, i=1, . . . , L, which are used to quantize information for transmission. Altogether, the L quantization matrices amount to $n_T \cdot L$ column vectors, where each column vector has $n_T$ entries. Each mobile unit quantizes its single user channel direction to the codeword of the codebook that maximizes a given criterion. At the mobile side, scalar or vector quantization can be used.

The base station can generate the pre-coding matrices based on its knowledge of the matrices $H_k$, k=1, . . . , K. However, this knowledge is typically incomplete because the transmitter at the base station is not able to determine the exact values of the channel matrices $H_k$. The base station must therefore rely on feedback from each mobile unit that reports an estimate the mobile unit's single-user channel matrix $H_k$. For example, when the base station implements an opportunistic scheme, each user periodically reports channel direction information that includes information indicating a preferred subset of the column vectors (or code words) in the codebook of L quantization matrices, $C_i$, i=1, . . . , L. The channel direction information is reported via the reverse link to the base station. The users also report a quality indicator corresponding to a hypothetical transmission associated with each preferred column. The base station can then generate precoding matrices using the channel direction information provided by the mobile units.

A general solution for the optimal vector quantizer that maximizes the mutual information in a MIMO multi-user transmission is not known. Love, et al ("Grassmannian beamforming for multiple-input multiple-output wireless systems," IEEE Trans. Inf. Theory, vol. 49, no. 10, pp. 2735-2747, October 2003) have demonstrated that the problem of maximizing the throughput for a MIMO single-user system with limited feedback is equivalent to the problem of packing one dimensional subspace known as Grassmannian line packing. However, this approach has not been extended to the multi-user case and in particular to zero forcing (ZF) based scheme.

Santipath and Honig ("Asymptotic capacity of beamforming with limited feedback," in IEEE Int. Symp. Info. Theory, Chicago, Ill., USA, July 2004, "Signature optimisation for CDMA with limited feedback," IEEE Trans. Inf. Theory, vol. 51, no. 10, pp. 3475-3492, October 2005) describe random vector quantization (RVQ) techniques. In RVQ techniques, quantization codewords are independently chosen from an isotropic distribution on an M-dimensional unit sphere, where M is the number of transmit antennas. The RVQ approach provides an estimate of the lower bound of the performance of a quantization scheme because any reasonably well-designed codebook should perform at least as well as RVQ. When the number of feedback bits is small, the lower bound could be very loose because a RVQ codebook does not uniformly cover the M-dimensional space.

Philips ("System-level simulation results for channel vector quantization feedback for MU-MIMO," 3GPP TGS RAN WG1, R1-063028, November 2006) proposes a Fourier codebook construction that provides good performance for line-of-sight channels or channels with a small angle-of-spread. This codebook is constructed by extracting the top M rows of a discrete Fourier transform (DFT) matrix of size P, where P is the codebook size. A codeword is then selected from the codebook using feedback information provided by the mobile unit in response to information transmitted by the base station. However, the quantization value indicated by a code word selected from the codebook is fixed once transmission to the mobile unit has been scheduled. The technique described by Philips does not permit the quantization value for a scheduled transmission by the mobile unit to be refined once it has been selected. Thus, quantization values used by mobile units that are scheduled to transmit multiple frames cannot be modified by exploiting the previous quantization vectors.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided that may be implemented in a base station having a plurality of antennas and one or more user terminals. One embodiment of the method includes receiving feedback from at least one user in response to transmitting a first frame to said at least one user. The first frame is formed by pre-coding at least one symbol using at least one first code word selected from at least one first code book associated with the at least one user. The method also includes transmitting at least one second frame to the user(s). The second frame(s) are pre-coded using at least one second codeword selected from at least one second codebook. The second codebook(s) determined based on the feedback and the first codeword(s).

Another embodiment of the method includes receiving, from the base station, a first frame formed by pre-coding at least one symbol using a first code word selected from a first code book associated with the user terminal. The method also includes transmitting information indicative of a second codebook and at least one second codeword selected from the second codebook. The second codebook is determined based on the first codeword.

BRIEF DESCRIPTION OF THE DRAWINGS

The invention may be understood by reference to the following description taken in conjunction with the accompanying drawings, in which like reference numerals identify like elements, and in which.

Figure 1:
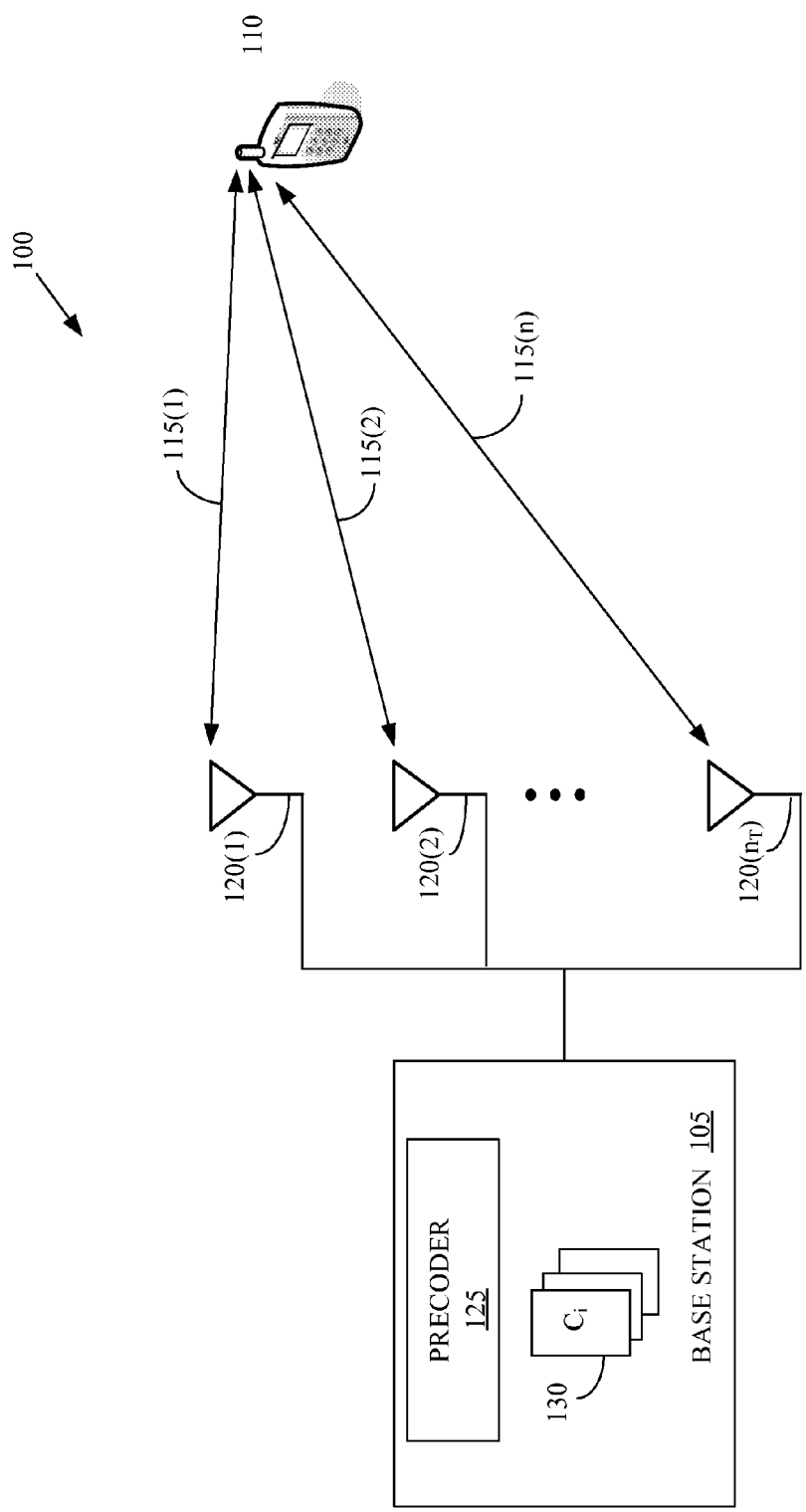
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a base station 105 that provides wireless connectivity to one or more users 110 (only one shown in FIG. 1) over corresponding air interfaces 115. However, persons of ordinary skill in the art having benefit of the present disclosure should appreciate that the present invention is not limited to wireless communication systems 100 that use base stations 105 to provide wireless connectivity. In alternative embodiments, the wireless communication system 100 may use other devices to provide wireless connectivity, such as base transceiver stations, base station routers, WiMAX or WiFi access points, access networks, and the like. Techniques for establishing, maintaining, and operating air interfaces 115 to provide uplink and/or downlink wireless communication links between the base station 105 and the users 110 are known in the art and in the interest of clarity only those aspects of establishing, maintaining, and operating the air interfaces 115 that are relevant to the present invention will be discussed herein.

The base station 105 includes multiple antennas 120 for transmitting and/or receiving information over the air interfaces 115. Although three antennas 120 are depicted in FIG. 1, persons of ordinary skill in the art having benefit of the present disclosure should appreciate that the base station 105 is not limited to any particular number of antennas 120. Moreover, persons of ordinary skill in the art having benefit of the present disclosure should appreciate that, in some embodiments, the users 110 may also include multiple antennas. The base station 105 may therefore employ multiple-input-multiple-output (MIMO) techniques so that the multiple antennas 120 can transmit multiple independent and distinct signals to the users 110 concurrently and on the same frequency band using spatially multiplexed channels of the air interfaces 115.

In the illustrated embodiment, the base station 105 includes a precoder 125 that maps signals to be transmitted to each user 110 onto the available channels using pre-coding matrices associated with the user 110. The precoding matrix is generated based on the vector quantization feedback obtained from each user 110. The base station 105 may therefore store code books 130 of quantization matrices, $C_i$, associated with each user 110 that is connected to the base station 105 In one embodiment that includes a base station 105 having $n_T$ antennas 120, the quantization matrices, $C_i$ are $n_T \times n_T$ unitary pre-coding matrices, i.e. satisfying $CC^H = I$. The quantization matrices, $C_i$, stored in the codebooks 130 are defined so that they can be part of a hierarchical code book that includes multiple levels. The hierarchical codebook is organized such that each of the quantization matrices in a relatively low level are associated with one of the quantization matrices in the next higher level. The quantization matrices in a relatively high level are each associated with more than one of the quantization matrices in the next lower level. For example, the quantization matrices may be organized in a tree structure such that higher-level quantization matrices are associated with multiple branches that indicate lower level pre-coding matrices. For example, the quantization matrices, $C_i$, could be discrete Fourier transform (DFT) pre-coding matrices. However, persons of ordinary skill in the art should appreciate that in alternative embodiments hierarchical codebooks can be organized in other ways.

The wireless communication system 100 utilizes a system model to define channels between the base station 105 and the users 110. In the illustrated embodiment, the system model includes a narrowband multi-antenna downlink channel that is modeled as a MIMO-BC with flat fading. This model assumes that the base station 110 includes M transmit antennas 120 and K users 110 that are each equipped with N antennas. The discrete-time complex baseband signal received by the k-th user 110 is:

$$y_k = H_k x + n_k; k=1, \ldots, K$$

where $H_k \in C^{N \times M}$ is the k-th user's channel matrix, $x \in C^{M \times 1}$ is the transmitted signal vector, and each element of the complex additive white Gaussian noise at the user $(n_k)$ is $\approx CN(0, 1)$. The transmitted signal satisfies the sum-power constraint:

$$E[tr\{xx^H\}] \leq P,$$

and the transmitted signal after pre-coding can be written as:

$$x = \sum_{k=1}^{|S|} G_k d_k,$$

where $d_k = [d_{k,1}, \ldots, d_{k,|S_k|}]^T$ is the $|S_k|$ dimensional vector of symbols. The channel matrices are typically not perfectly known at the base station 105, but receivers at the users 110 may be able to estimate the associated single-user channel matrix and may be able to provide some amount of channel state information to the base station on a finite-rate, approximately zero-delay, and approximately error-free feedback channel. However, persons of ordinary skill in the art having benefit of the present disclosure should appreciate that this model is an idealization and is not intended to be an exact representation of actual transmissions.

In operation, the base station 105 transmits pilot signals from each antenna 120 over the air interfaces 115 to the user 110, which may estimate the channels of the air interfaces 115 using the pilot signals. The user 110 may also calculate a channel direction indicator and/or a channel quality indicator. In one embodiment, the channel direction indicator includes information indicative of a codebook determined by the user 110 and one or more codewords selected from this codebook. The user 110 may then provide feedback to the base station 105 including information indicative of the channel detection indicator and/or the channel quality indicator. The base station 105 may then use the provided feedback to choose a set of users 110 to serve based on a sum rate criterion. The base station 105 may compute a pre-coding (or beamforming) vector for each user 110 and use the pre-coding vector to transmit information, such as a frame, to each user 110.

Each user 110 may continue to provide feedback to the base station 105 following the initial feedback provided in response to the pilot signal. The base station 105 may use the additional feedback provided by each user 110 to update the codewords and/or codebook associated with each user 110. In the illustrated embodiment, the feedback bits B provided by each user 110 includes $B_I$ bits, $b_I=[b_I^{(0)}, \ldots, b_I^{(B_I-1)}]$, which are used for updating the quantization codebook and $B_c$ bits, $b_c=[b_c^{(0)}, \ldots, b_c^{(B_c-1)}]$, which are used for mapping the different codewords belonging to the same codebook. The total number of feedback bits is therefore: $B=B_I+B_c$, where $P=2^{B_c}$ and $2^{B_I} \geq L$. The codebooks should be constructed so that the feedback provided by the users 110 is sufficient to synchronize the codebooks maintained by the users 110 and the base station 105. For example, the code books associated with each user 110 may be part of a hierarchical codebook, e.g., each quantization codebook is a part of a level l of a hierarchical codebook that has L levels, where $0 \leq l \leq L$, and the bits may be used to indicate selected code words and/or code books. When the codebooks are modified or updated, the code words in each of the modified or updated codebooks should involve a possible improvement of the quantization quality. In one embodiment, the codebooks should also be constructed so that a codeword chosen at the (l−1)-th level of the hierarchical codebook also belongs to an l-th level codebook. However, persons of ordinary skill in the art should appreciate that in alternative embodiments hierarchical codebooks could be organized in other ways.

In one embodiment, the hierarchical codebook is constructed based on a DFT quantization codebook. For example, let $\tilde{h} \in C^M$ be the normalized channel vector (or channel direction) for a given receiver, after the receive combing stage. Let M be the number of transmit antennas 120 and let K be the number of users 110 in the system each equipped with N antennas. The DFT matrix of dimension P is defined as:

$$F_P = \left[ e^{-j\frac{2\pi nm}{P}} \right]_{n,m=0,\ldots,P-1}.$$

Supposing that P>M, the user 110 constructs a level 1 code book (e.g., based on the pilot signals provided by the base station 105) using the formula:

$$C_k^{(1)} = \left\{ \left[ \frac{F_P}{\sqrt{M}} \right]_{0:M-1,q} \right\} q = 0, \ldots, P-1.$$

An initial code word is then selected from the level 1 code book based on given maximization criterion $$\hat{h} = \underset{c \in C_k^{(l)}}{\operatorname{argmax}} d(\tilde{h}, c)$$

For example a minimum chordal distance criterion could be used. However, persons of ordinary skill in the art having benefit of the present disclosure should appreciate that other criteria may be used. The user 110 may then transmit feedback bits representative of the selected code book and/or code word to the base station 105, which may transmit information to the user 110 using pre-coding matrices determined based on the feedback from the user 110 and any other users in the system 100. Following the initial feedback, the user 110 may continue to provide feedback bits to further refine or improve the pre-coding matrices selected by the base station 105.

Figure 2:
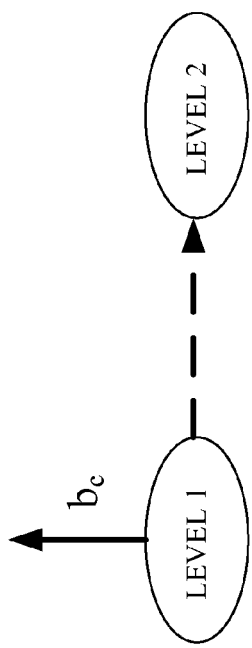
FIG. 2 conceptually illustrates one exemplary transition indicated by feedback bits provided by the user, in accordance with the present invention.

FIG. 2 conceptually illustrates one exemplary transition indicated by feedback bits provided by the user 110. The only possible transition from the initial level 1 code book is from level 1 to level 2, and this transition is indicated with a dotted arrow in FIG. 2. Since this is the only possible transmission, the user 110 only provides the $B_c$ feedback bits for mapping $\hat{h}^{(1)}$ and does not transmit bits for mapping to the new level. The transmission of the $B_c$ feedback bits is indicated with a solid arrow in FIG. 2.

Figure 3:
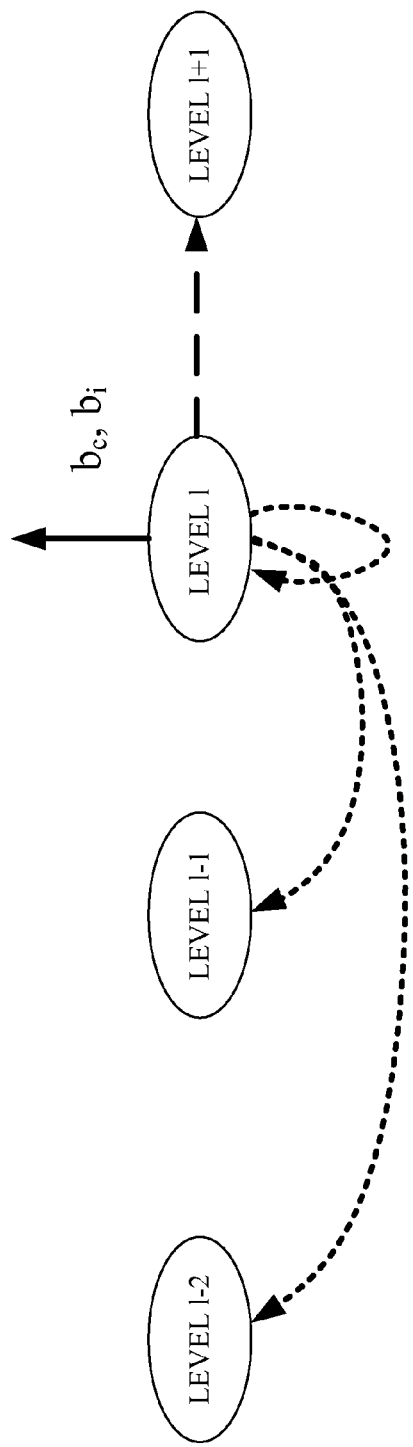
FIG. 3 conceptually illustrates one exemplary set of transitions indicated by feedback bits provided by the user, in accordance with the present invention.

FIG. 3 conceptually illustrates one exemplary set of transitions indicated by feedback bits provided by the user 110. In the illustrated embodiment, the user 110 has previously transitioned to a code book at quantization level l. The user 110 checks to determine whether the sequence $\hat{h}^{(1)}, \ldots, \hat{h}^{(\bar{l}-1)}$ of previous selected codewords is still optimum given the sequence of generated codebooks $C^{(1)}, \ldots, C^{(\bar{l}-1)}$. This check helps the user 110 to track channel variations. If a different value is found at the $\bar{l}$ th level, then a new value for $\hat{h}^{(\bar{l})}$ is generated. The new value for $\hat{h}^{(\bar{l})}$ is communicated to the base station 105 using the $B_c$ bits and the value of $\bar{l}$ is communicated to the transmitter by using the $B_I$ bits. The level to be used at the next step is set to $\bar{l}+1$, and this indicated in FIG. 3 below by using a dashed arrow. If the user 110 determines that the previous sequence of selected codewords is still optimum, a new codebook is generated as follows:

$$C^{(l)} = \left\{ \left[ \frac{F_{Pl}}{\sqrt{M}} \right]_{0:M-1,(w^{(l-1)}P+q) \bmod P} \right\} q = -\frac{P}{2}, \ldots, \frac{P}{2},$$

where $w^{(l-1)}$ is the index of $\hat{h}^{(l-1)}$ in $C^{(l)}$. The user 110 then selects the l-th level code word from the new code book using a given maximization criterion:

$$\hat{h}^{(l)} = \underset{c \in C_k^{(l)}}{\operatorname{argmax}} d(\tilde{h}, c)$$

For example the minimum chordal distance criterion could be used. However, persons of ordinary skill in the art having benefit of the present disclosure should appreciate that other criteria may be used. This value is communicated to the transmitter by using the $B_c$ bits, whereas the value of $\bar{l}+1$ is communicated to the transmitter by using the $B_I$ bits.

Figure 4:
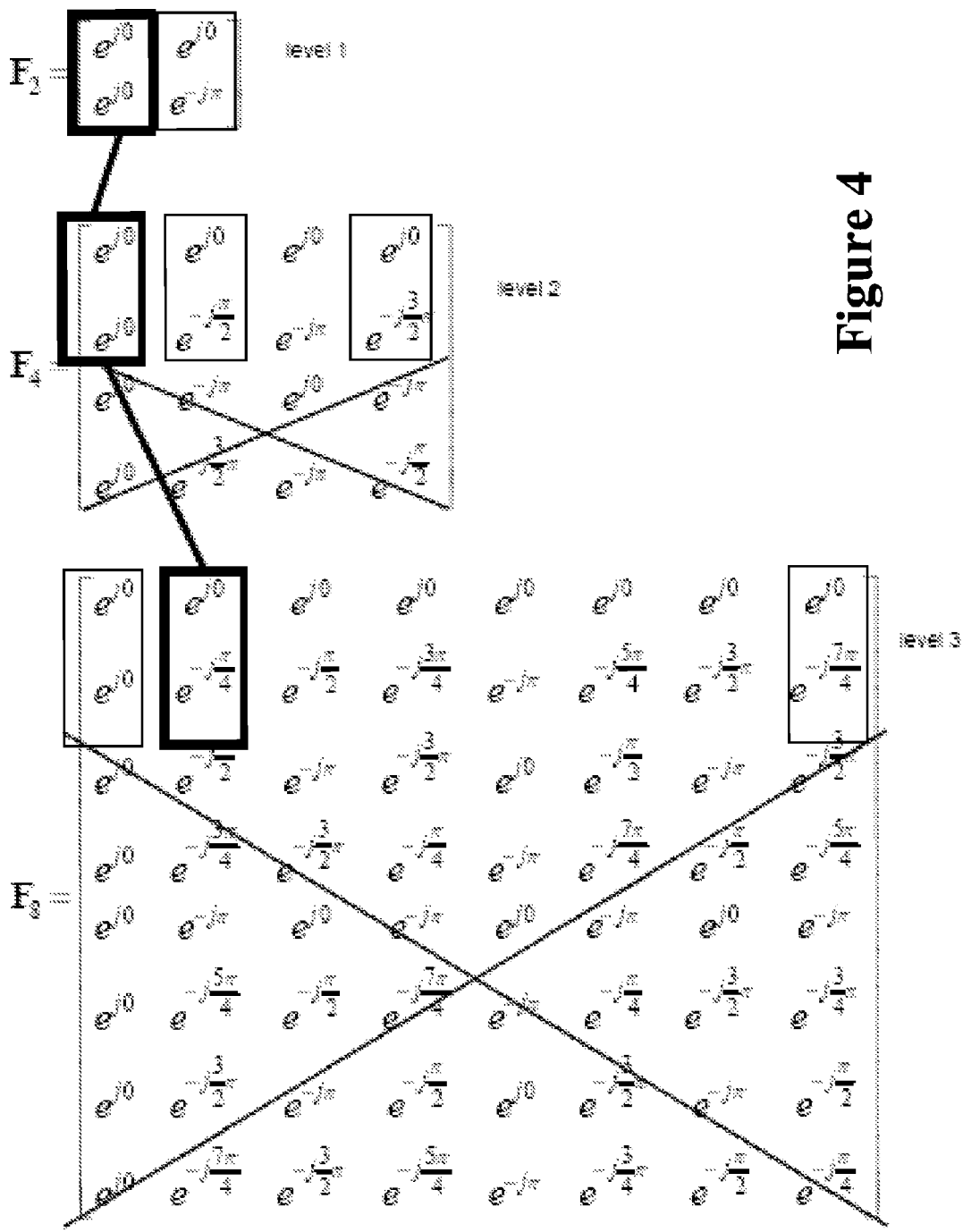
FIG. 4 illustrates one exemplary embodiment of a discreet Fourier transform-based hierarchical codebook construction, in accordance with the present invention.

The user 110 also has the option of performing a backward step to a higher level, as indicated by the dotted arrows in FIG. 3. For example, since the channel vector is typically time variable, the preferred codebook may be found among higher levels in a previously explored subtree of the hierarchical codebook. The user 110 may elect to perform a backward step to the next higher level (l−1), e.g., in cases where slow fading causes relatively small changes in the channels. Alternatively, the user 110 may elect to perform a backward step to a codebook that is more than one level higher than the current codebook, e.g., in cases where fast fading causes relatively large variations in the channels FIG. 4 illustrates one exemplary embodiment of a discreet Fourier transform-based hierarchical codebook construction. In the illustrated embodiment, P=2, M−2, and L=3. At each level the codewords are selected from the sub matrix obtained from the DFT by considering only the first M rows. The codewords of the l-th level codebook are denoted by rectangles. The sequence of "best" codewords is denoted by the bold rectangles.

The closed-loop beamforming techniques described herein may have a number of advantages over conventional practice. Under ideal conditions of perfect channel knowledge at the transmitter, conventional and advanced beamforming techniques promise significant performance gains compared to single-antenna transmission techniques. The techniques described herein may approach ideal beamforming performance in a simple, practical manner. For a given level of complexity, the proposed hierarchical technique has been shown to outperform conventional non-hierarchical techniques, particularly in cases where the channel is slowly changing, such as fixed wireless systems. Under these conditions, the hierarchical technique is especially efficient for achieving near-ideal beamforming performance. The techniques described herein may be implemented in any system using beamforming based on limited channel state feedback, including all next-generation cellular standards including LTE, UMB, 802.16e, and 802.16m.

Figure 5:
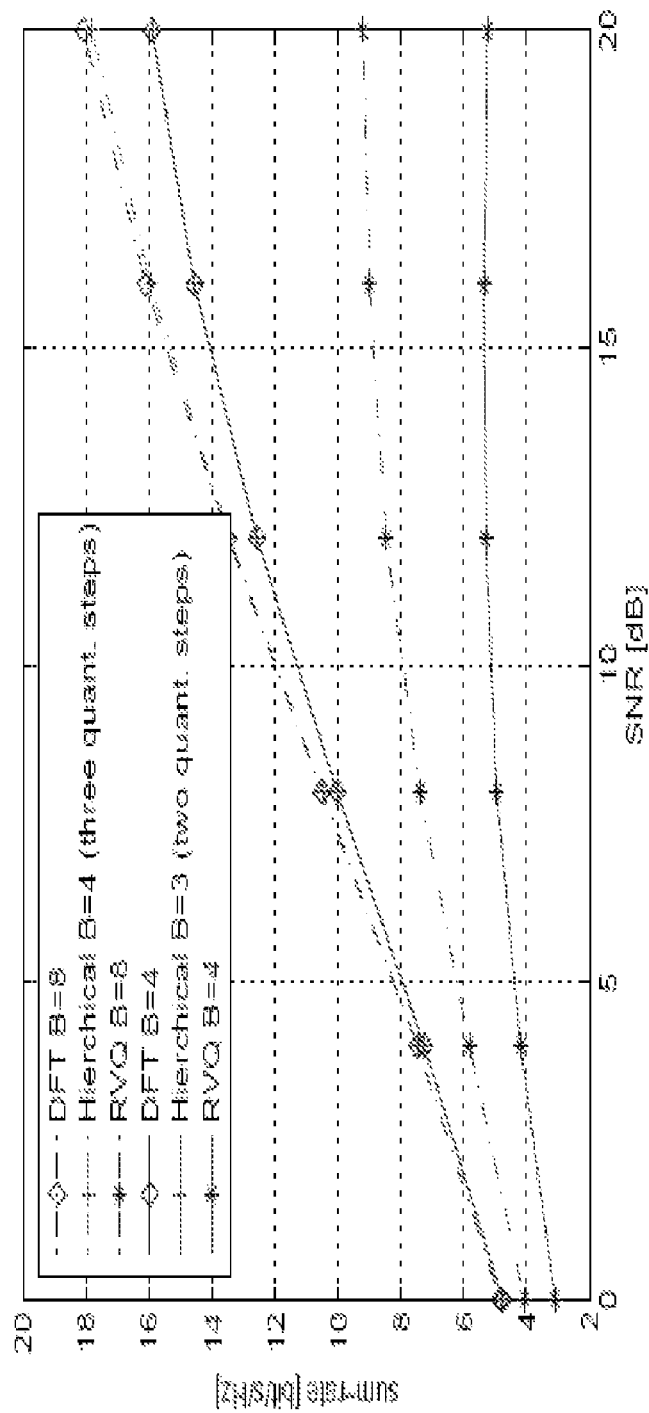
FIG. 5 compares the sum rate as a function of the signal-to-noise ration for a rural macrocell propagation scenario (scenario D1 of WINNER) for N=1.
Figure 6:
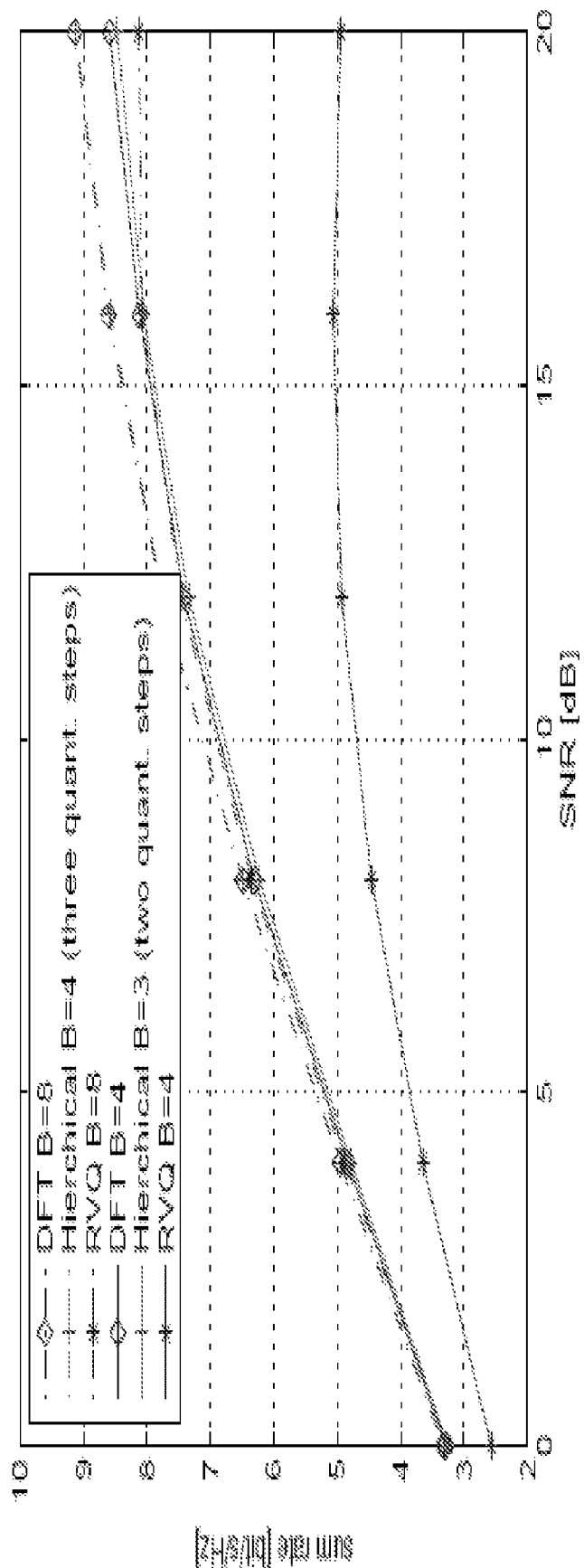
FIG. 6 compares the sum rate as a function of the signal-to-noise ration for an indoor propagation scenario (scenario A1 of WINNER) for N=1.

The link performance of the proposed technique may be compared with the Fourier codebook and RVQ techniques for a spatial channel model (SCM) with M=4 antennas at the transmit side, N=1, 2 antennas at the receive side, 0.5 wavelength element spacing both at the base and at each user, K=10 users. The channel is considered perfectly estimated at the receive side. FIG. 5 compares the sum rate as a function of the signal-to-noise ratio for a rural macrocell propagation scenario (scenario D1 of WINNER) for N=1. FIG. 6 compares the sum rate as a function of the signal-to-noise ration for an indoor propagation scenario (scenario A1 of WINNER) for N=1. The proposed scheme has been implemented for B=3 (2 quantization stages) and B=4 (3 quantization stages). The proposed hierarchical technique obtains the same performance as the Fourier codebook with a lower number of feedback bits. Moreover, the proposed scheme clearly outperforms the RVQ techniques. The hierarchical approach also reduces the computational load at the receive side.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method implemented in a base station having a plurality of antennas, comprising:
    associating at least one user with at least one first code word selected from at least one first code book wherein associating said at least one user with said at least one first codeword selected from said at least one first codebook comprises:
        transmitting a plurality of pilot signals from the plurality of antennas;
        receiving information indicative of said at least one first code word and said at least one first code book from said at least one user in response to transmitting the plurality of pilot signals; and
        selecting said at least one user based on a sum weight criterion;
    receiving feedback from at least one user in response to transmitting a first frame to said at least one user, the first frame formed by pre-coding at least one symbol using at least one first code word selected from at least one first code book associated with said at least one user; and
    transmitting at least one second frame to said at least one user, said at least one second frame being pre-coded using at least one second codeword selected from at least one second codebook, said at least one second codebook being determined based on the feedback and said at least one first codeword.

2. The method of claim 1, wherein receiving feedback from said at least one user comprises receiving information indicative of said at least one second codeword and said at least one second codebook, said at least one first code book and said at least one second codebook being different levels in the codebook hierarchy, the first and second codebooks comprising first and second pluralities of discrete Fourier transform matrices, respectively.

3. The method of claim 2, wherein at least one codeword belongs to both the first and second codebooks.

4. A method implemented in a base station having a plurality of antennas, comprising:
    receiving feedback from at least one user in response to transmitting a first frame to said at least one user, the first frame formed by pre-coding at least one symbol using at least one first code word selected from at least one first code book associated with said at least one user;
    transmitting at least one second frame to said at least one user over a channel, said at least one second frame being pre-coded using at least one second codeword selected from at least one second codebook that is part of a previously explored subtree of a codebook hierarchy that includes the first and second codebooks based on the feedback; and
    pre-coding said at least one second frame using said at least one second codeword selected from said at least one second codebook in a lower level of the codebook hierarchy when said at least one codeword is still optimum.

5. A method implemented in a base station having a plurality of antennas, comprising:
    receiving feedback from at least one user in response to transmitting a first frame to said at least one user, the first frame formed by pre-coding at least one symbol using at least one first code word selected from at least one first code book associated with said at least one user;
    transmitting at least one second frame to said at least one user over a channel, said at least one second frame being pre-coded using at least one second codeword selected from at least one second codebook that is part of a previously explored subtree of a codebook hierarchy that includes the first and second codebooks based on the feedback;
    pre-coding said at least one second frame using at least one second codeword selected from at least one second codebook in a next higher level of the codebook hierarchy when relatively slow fading causes relatively small changes in the channel; and
    pre-coding said at least one second frame using at least one second codeword selected from at least one second codebook that is more than one level higher in the codebook hierarchy than said at least one first codebook when relatively fast fading causes relatively large changes in the channel.

6. The method of claim 4 or 5, comprising associating said at least one user with said at least one first code word selected from said at least one first code book.

7. The method of claims 1, 4, or 5, wherein receiving feedback from said at least one user comprises receiving information indicative of said at least one second codeword and said at least one second codebook, said at least one first code book and said at least one second codebook being different levels in the codebook hierarchy, the first and second codebooks comprising first and second pluralities of discrete Fourier transform matrices, respectively.

8. The method of claims 1, 4, or 5, wherein receiving feedback from said at least one user comprises receiving a plurality of bits indicative of said at least one second code word and said at least one second codebook.

9. The method of claims 1, 4, or 5, wherein the feedback indicates the channel is changing.

10. The method of claim 1, 4, or 5, wherein at least one codeword belongs to both the first and second codebooks.

11. A method implemented in user terminal configured to communicate with a base station having a plurality of antennas, comprising:
   receiving from the base station over a channel, a first frame formed by pre-coding at least one symbol using a first code word selected from a first code book associated with the user terminal,
   forming the second codebook based on the first codeword, wherein forming the second codebook comprises forming the second codebook such that the first code book and the second codebook represent different levels in a hierarchy of codebooks, the first and second codebooks comprising first and second pluralities of discrete Fourier transform matrices, respectively,
   transmitting information indicative of the second codebook and at least one second codeword selected from the second codebook, wherein the second codebook is part of a previously explored subtree of the codebook hierarchy that includes the first and second codebooks, and wherein the second codebook is determined based on the first codeword, wherein forming the second codebook comprises forming the second codebook such that the second codebook is at a lower level than the first codebook in the codebook hierarchy when said at least one first codeword is still optimal, and wherein said at least one first codeword is in the second codebook.

12. A method implemented in user terminal configured to communicate with a base station having a plurality of antennas, comprising:
   receiving, from the base station over a channel, a first frame formed by pre-coding at least one symbol using a first code word selected from a first code book associated with the user terminal;
   forming the second codebook based on the first codeword, wherein forming the second codebook comprises forming the second codebook such that the first code book and the second codebook represent different levels in a hierarchy of codebooks, the first and second codebooks comprising first and second pluralities of discrete Fourier transform matrices, respectively;
   transmitting information indicative of the second codebook and at least one second codeword selected from the second codebook, wherein the second codebook is part of a previously explored subtree of the codebook hierarchy that includes the first and second codebooks, and wherein the second codebook is determined based on the first codeword, wherein forming the second codebook comprises forming the second codebook such that the second codebook is at a next higher level than the first codebook in the codebook hierarchy when slow fading causes relatively small changes in the channel.

13. A method implemented in user terminal configured to communicate with a base station having a plurality of antennas, comprising:
   receiving, from the base station over a channel, a first frame formed by pre-coding at least one symbol using a first code word selected from a first code book associated with the user terminal;
   forming the second codebook based on the first codeword, wherein forming the second codebook comprises forming the second codebook such that the first code book and the second codebook represent different levels in a hierarchy of codebooks, the first and second codebooks comprising first and second pluralities of discrete Fourier transform matrices, respectively;
   transmitting information indicative of the second codebook and at least one second codeword selected from the second codebook wherein the second codebook is part of a previously explored subtree of the codebook hierarchy that includes the first and second codebooks, and wherein the second codebook is determined based on the first codeword, wherein forming the second codebook comprises forming the second codebook such that the second codebook is more than one level higher than the first codebook in the codebook hierarchy when fast fading causes relatively large changes in the channel.

14. The method of claim 11, 12, or 13, wherein forming the second codebook based on the first codeword, comprises:
   receiving a plurality of pilot signals from the plurality of antennas; and
   forming the second codebook based on the first codeword and the plurality of pilot signals.

15. The method of claim 11, 12, or 13, wherein transmitting information indicative of the second codebook and said at least one second codeword comprises transmitting a plurality of bits indicative of said at least one second code word and the second codebook.

16. The method of claim 11, 12, or 13, comprising receiving, from the base station, at least one second frame that was pre-coded using said at least one second codeword selected from the second codebook.

17. The method of claim 11, 12, or 13, wherein said second codebook is part of the previously explored subtree when the channel is changing.

18. The method of claim 11, 12, or 13, wherein at least one codeword belongs to both the first and second codebooks.

19. A method implemented in user terminal configured to communicate with a base station having a plurality of antennas, comprising:
   receiving, from the base station, a first frame formed by pre-coding at least one symbol using a first code word selected from a first code book associated with the user terminal;
   selecting said at least one second codeword from a second codebook that is at a higher level in a hierarchical codebook than the first codebook wherein selecting said at least one second codeword from the second codebook at the higher levels in the hierarchical codebook comprises selecting said at least one second codeword from a previously formed second codebook;
   transmitting information indicative of the second codebook and said at least one second codeword selected from the second codebook, the second codebook being determined based on the first codeword.

* * * * *